Patented Oct. 3, 1939

2,174,570

UNITED STATES PATENT OFFICE 2,174,570

METHOD OF RECOVERING METALS FROM SOLUTIONS

Albert B. Doran, Los Angeles, Calif.

No Drawing. Application April 22, 1938,
Serial No. 203,618

8 Claims. (Cl. 75—108)

This invention relates to the recovery of metals from their solutions and more particularly to the recovery of metals in the form of their insoluble permanganites.

It is an object of the present invention to provide a process for recovering a metal from a solution containing a soluble metal salt comprising treating or contacting said solution with an insoluble metallic permanganite whereby a metathesis or base-exchange is obtained which serves to form an insoluble permanganite of the metal which it is desired to recover, the metallic ion originally associated with the permanganite being released to the solution.

It is furthermore an object of the present invention to provide such a process in which the reacting permanganite is associated with a metal higher in the electromotive series than the metal which it is desired to recover from solution.

It is furthermore an object of the present invention to replace heavy metals from their solutions by the action of an insoluble alkali or alkaline earth permanganite and to recover said heavy metals in the form of insoluble permanganite salts.

It is also an object of the present invention to provide a process for the recovery of metals from their permanganite salts, and more particularly from such permanganite salts as are produced in accordance with this invention.

By the term "permanganite" I have reference to salts of permanganous acid $H_2MnO_3$ of which the anhydride $MnO_2$ is well known. This term is used in contradistinction to manganites, or salts of trivalent acidic manganese, which latter form the specific subject matter of my copending application Serial No. 247,830. Alkali permanganite may be variously produced. For example, it is known that when $Mn(OH)_2$ is oxidized in the presence of an alkali, the brown substance produced contains more or less alkali combined with the $MnO_2$ in the form of alkali permanganite. Lime permanganite, e. g., $CaO.MnO_2$ and $CaO.2MnO_2$, is produced in the Weldon manganese recovery process for the manufacture of chlorine. Alkali permanganites are also produced in certain instances during alkaline oxidation with manganate and permanganate.

According to their method of production, the permanganites may be obtained in more or less pure form, although it is not necessary for the practice of my invention that they be pure. For example, I may use a mixture in which sodium permanganite is associated with more or less $MnO_2$ or other manganese compound, or I may use complex permanganites such as sodium pentapermanganite $Na_2O.5MnO_2$.

The permanganite salts are in general highly insoluble in water and as usually prepared represent dark brown to black, finely divided solids.

I have discovered that a permanganite salt of a given metal has the property of replacing from solution any metal lower in the electromotive series. For example, I may take a solution of copper nitrate in water and add thereto sodium permanganite or a sodium permanganite bearing material in such proportion that the quantity of sodium is slightly in excess of that chemically equivalent to the copper. The permanganite is suitably added as a powder and kept in contact with the solution by agitation during the reaction. I find that under these conditions the sodium permanganite is rapidly transformed into copper permanganite, the sodium ion thereby released being taken up by the solution as sodium nitrate. After a sufficient period has elapsed to insure the completeness of the reaction, the solution will be found free from even spectroscopic traces of copper.

When a very finely divided permanganite is used, only a few minutes of intimate contact are necessary for the completion of this metathesis or base-exchange.

The insoluble black powder now bearing as copper permanganite all of the copper originally present in the solution, may be separated from the spent solution by filtration, decantation or other suitable method. The copper permanganite thus obtained may, if desired, be used to replace metals which lie below copper in the electromotive series. For instance, if brought into contact with a solution of silver nitrate or other soluble silver salt, a silver permanganite will be obtained and copper will be released to the solution in equivalent proportion to the silver absorbed. It is not necessary, however, to proceed through intermediate steps such as those just indicated, since silver may be absorbed directly from solution by the use of an alkali permanganite or the permanganite of any metal lying above silver in the electromotive series.

Having obtained the desired metal in the form of its permanganite salt, it may be further worked up in various ways. For example, it may be treated with a solution of a metal still lower in the electromotive series, thereby obtaining an aqueous solution of the desired metal in the form of a soluble salt. Again, the desired metal permanganite may be worked up by various metallurgical methods to obtain the desired metal. In many instances the metal may be obtained directly from the permanganite salt by heating of the latter. Thus, for example, silver permanganite is decomposed at temperatures around 1900° F. to form molten silver metal and various oxides of manganese, the molten silver collecting as a puddle at the bottom of the charge. Copper and gold permanganite may be similarly decomposed by heat.

When a solution containing a mixture of various metals is treated with permanganite according to the present process, the absorption is preferential beginning with the metal which is lowest in the electromotive series, the remaining metals not being absorbed or being absorbed only after the solution is exhausted in the least electro-positive metal.

An apparent exception to this general rule arises in the case of hydrogen. Hydrogen ion is displaced from water only with difficulty, if at all, by a permanganite lying above hydrogen in the electromotive series, for example, potassium permanganite. On the other hand, hydrogen permanganite, or permanganous acid, does serve as a suitable reagent for the displacement of metals lying below hydrogen in the electromotive series, for example, copper, silver, or gold, the exchange in this latter case being accomplished readily and without difficulty. The relative inertness of dissolved hydrogen ions toward permanganites of metals lying above hydrogen in the electromotive series makes it possible to conduct replacement reactions among the compounds of metals higher than hydrogen in the electromotive series in neutral, or even acidic aqueous solutions. For example, an aqueous solution of aluminum nitrate may be treated with sodium permanganite to obtain an insoluble aluminum permanganite and a solution of sodium nitrate, without substantial metathesis between the sodium permanganite and water.

In conformity with this behavior, the reagent permanganite may be described as the permanganite salt of any metal higher in the electromotive series than the metal which it is desired to recover, and including permanganite salt of hydrogen (permanganous acid). It should be noted, however, that the process is not designed to displace or recover hydrogen ion from aqueous solutions, and in speaking of the recovery of metals, reference is had only to the true metals, excluding hydrogen.

While the electromotive series as normally presented provides a criterion for the base-exchanges or replacements possible by the practice of my invention, with certain exceptions as to hydrogen as above noted, it is not to be implied that metals not listed in the usual electromotive series are not amenable to my process. For example, I have found that elements such as thorium, uranium, radium, palladium, and the like, which are not listed in the usual electromotive series, are all replaceable from their solutions by permanganite salts of metals high in the electromotive series, such as potassium, strontium, or calcium permanganite. In general I find that the relative replaceability of these unlisted elements may be inferred from their position in the periodic system following the approximate relationship existing between electrode potentials and positions in the periodic table.

As above indicated, my invention does not necessitate the use of a pure permanganite. The usual method for the formation of a permanganite salt results in the concomitant production of substantial amounts of $MnO_2$. Such a mixture may be used for the absorbtion of other metals as above described. The base exchange efficiency of such a mixture, for example a mixture as produced by the oxidation of $Mn(OH)_2$ in the presence of potassium hydroxide, depends on the amount of insoluble potassium present in such a mixture, this value corresponding to the proportion of true alkali permanganite, either in the form of a simple permanganite such as $K_2MnO_3$ or of a complex permanganite such as $K_2Mn_5O_{11}$. When such an impure alkali permanganite is used to form other metal permanganites according to my process, the metal content of the permanganite so produced will be found to be substantially equivalent to the original content in insoluble potassium.

In at least some instances I find it preferable to use alkali and alkaline earth permanganites for the recovery of less electro-positive metals such as the heavy metals in preference to permanganites of other metals of suitably electropositive character. Furthermore the alkali and alkaline earth permanganites are the most readily prepared, and may correspondingly be regarded as primary materials for my process, although it is not intended to imply that it is necessary to start with these particular permanganites.

While it may reasonably be assumed that the active alkaline (or other metallic) constituent associated with the manganese dioxide in an insoluble form is actually present as a true permanganite, and properly termed as such, I do not wish to be bound by any theory as to the precise molecular structures involved, and where reference is made to a permanganite salt, I wish only to imply that the basic oxide and manganese dioxide are in an associated or compound form, which form is characterized by its insolubility in water and its property of base-exchange as herein described. My base exchange material, containing a base oxide and an oxide of manganese in combined form, may generally comprise either a permanganite or a manganite, or both, the manganite, however, being more fully described and specifically claimed in my above mentioned copending application.

Various means may be employed for intimately contacting the permanganite with the solution to be treated, and for the separation of the permanganite and spent solution after treatment. It is frequently advantageous to accomplish these objects in a single step, as by percolation of the liquid to be treated through a porous bed or diaphragm comprising the reagent permanganite, supported if necessary on inert granular material.

The details of the above examples are illustrative only, the proper scope of my invention being delineated in the appended claims.

I claim as my invention:

1. A process for the recovery of a metal from solution, comprising: contacting said solution with an insoluble permanganite salt of a metal more electro-positive than the desired metal, said permanganite in amount being at least slightly in excess of that chemically equivalent to the metal which it is desired to recover, whereby an insoluble permanganite salt of the desired metal and a spent solution substantially exhausted in said metal are formed, and separating said insoluble salt from the spent solution.

2. A process for the recovery of a heavy metal from its aqueous solution, comprising: contacting said solution with a finely divided insoluble compound of manganese dioxide and an oxide selected from the class consisting of the oxides of the alkali metals and the alkaline earth metals, whereby said heavy metal replaces the alkali or alkaline earth metal in said compound; maintaining said contact until the solution is substantially exhausted in said heavy metal; and separating said compound bearing the heavy metal from the spent solution.

3. A process for recovery of a metal from solution, comprising: contacting said solution with an insoluble compound of a base and an oxide of manganese, said compound having base exchange properties whereby the base in said compound is adapted to exchange with the metal which it is desired to remove from solution; causing said base exchange to take place, whereby the desired metal replaces the base in the manganese compound, said compopnd being taken in amount sufficient to recover the desired metal substantially completely from the solution; separating the insoluble compound thus formed and containing the desired metal from the spent solution; and recovering the metal from said insoluble compound.

4. A process as in claim 3 in which the desired metal is gold, and in which the gold is recovered from the insoluble compound containing said gold by roasting at elevated temperatures.

5. A process as in claim 3 in which the desired metal is silver, and in which the silver is recovered from the insoluble compound containing said silver by roasting at elevated temperatures.

6. A process for recovery of a metal from solution, comprising: contacting successively flowing increments of the solution to be treated with an insoluble compound of a base and an oxide of manganese, said compound having base exchange properties whereby the base in said compound is adapted to exchange with the metal which it is desired to remove from solution; causing said base exchange to take place with each increment of solution, whereby the desired metal progressively replaces the base in the manganese compound; and separating the spent increments of solution from further contact with said compound.

7. A process for recovering a heavy metal from a dilute aqueous solution thereof, comprising: contacting the dilute aqueous solution with an insoluble permanganite of a metal from the group consisting of alkali and alkaline earth metals to form an insoluble manganite of the heavy metal and a solution substantially free of said metal; separating the insoluble manganite from the spent solution; and recovering the heavy metal from said manganite.

8. A process as in claim 6 in which the base originally associated with the manganese oxide is a metal of the class constituted by alkali and alkaline earth metals, and in which the recovered metal is a heavy metal.

ALBERT B. DORAN.